3,341,464
HEAT RESISTANT AMINIUM SALT INFRARED
ABSORBERS
Peter Vincent Susi and Ralph Arthur Coleman, Middlesex, N.J., assignors to American Cyanamid Company, Stamford, Conn., a corporation of Maine
No Drawing. Filed Apr. 22, 1963, Ser. No. 274,785
11 Claims. (Cl. 252—300)

This invention relates to heat-stable infrared absorbers. More particularly, it relates to heat-stable tris(p-dialkylaminophenyl)aminium salts; to the use of these heat-stable aminium salts as infrared absorbers in organic plastic substrates, and to transparent organic plastic compositions containing these aminium salts.

In the copending application for United States Letters Patent, Ser. No. 215,791, filed on Aug. 9, 1962, by P. V. Susi, one of the present inventors, jointly with J. P. Milionis, which application is now abandoned, there is disclosed as near infrared absorbers the use of certain tris(p-dialkylaminophenyl)aminium salts of the formula

(I)

wherein R is a lower alkyl group of 1–5 carbon atoms, particularly methyl and ethyl, and X is an anion. As disclosed therein, suitable anions specifically claimed include the perchlorate, fluoborate, trichloroacetate and trifluoroacetate.

Although the aminium salts containing anions so-disclosed are good infrared absorbers in organic plastic substrates for many uses, they suffer the disadvantage of being too sensitive to heat. For example, if they must be exposed to elevated temperatures for considerable periods, as in the compounding and processing of some organic plastic substrates, the infrared absorbing properties of these salts may be impaired to a very appreciable degree. This appears to be caused by heat regardless of the type of plastic in which they are incorporated.

It is the major object of this invention to provide aminium salts which retain the desirable properties of those set forth above but which combine therewith adequate resistance to above-noted deleterious effects of heat. In accordance with the present invention, this desirable combination of properties has been found in certain aminium salts of Formula I wherein X is an anion selected from the novel group of hexafluoroantimonate ($SbF_6$) and hexafluoroarsenate ($AsF_6$).

In the present invention, wherein X is selected from this group, the two compounds in which the alkyl group comprising "R" in Formula I is ethyl are preferred for most purposes. Other useful aminium salts than the two foregoing tris(p-diethylaminophenyl)-compounds include for example; tris(p-dimethylaminophenyl)aminium hexafluoroantimonate, tris(p-dimethylaminophenyl)aminium hexafluoroarsenate, tris(p-di-n-propylaminophenyl)aminium hexafluoroantimonate, tris(p-di-isopropylaminophenyl)aminium hexafluoroarsenate, tris(p-di-n-butylaminophenyl)aminium hexafluoroantimonate, tris(p-iso-butylaminophenyl)aminium hexafluoroantimonate, tris(p-di-iso-amylaminophenyl)aminium hexafluoroantimonate and the like.

Hexafluoroantimonates and hexafluoroarsenates of this invention are obtained by reacting the corresponding tris(p-dialkylaminophenyl)amine with silver hexafluoroantimonate or silver hexafluoroarsenate, respectively. A suitable organic solvent such as acetone, dimethylformamide or the equivalent is required. After an adequate reaction period at ambient temperature, the product is precipitated from the reaction mixture by the addition of a miscible organic solvent, such as ether, in which the product is not soluble. The product is then separated by filtration.

This procedure, which is generally adaptable, is shown by Neunhoeffer et al.; Ber. 92, 245 (1959). Therein, R in (I) may be substantially any lower alkyl for which the tris(p-dialkylaminophenyl)amine is available. The present invention, however, is primarily concerned with compounds of (I) in which R represents alkyls which contain from one to about five carbons. The various aminium salts discussed herein were prepared thereby, substituting the corresponding appropriate silver salt. Salts in which both R's are ethyl are typical and highly effective as eye protective agents. Accordingly, they are taken herein as illustrative.

Although both R's of Formula I above are shown and discussed above as identical, this is not an essential limitation. Moreover, the alkyls in each of the three p-dialkylaminophenyl groups may differ, as for example in bis(p-dimethylaminophenyl)(p-diethylaminophenyl)aminium perchlorate. Such mixed tris(p-dialkylaminophenyl)-amines also are prepared by the above-noted method, Neunhoeffer et al.; Ber. 94, 2511 (1961).

Suitable silver salts for use in preparing compounds of this invention may be readily prepared. As noted above, a suitable organic solvent is used as the reaction medium. Acetone and dimethylformamide are excellent for the purpose. Accordingly, they have been taken as illustrative in the present discussion although the invention is not necessarily so limited. Substantially any solvent of similar properties may be used, if the silver salt is sufficiently soluble in such solvent medium.

Radiant energy from the sun is frequently grouped into three regions, the near-ultraviolet, the visible and the near infrared. Together these three regions cover the range of wavelengths of from 0.290 micron to about 5.0 microns. Somewhat arbitrarily, the near-ultraviolet spectrum may be considered to cover the region of 0.300–0.400 micron; the visible spectrum, the region of 0.400–0.700 micron; and the near-infrared spectrum the region of 0.700–5.0 microns.

Heat from the sun is essentially due to the near-infrared radiant energy. Other high temperature bodies, such as tungsten filaments, fluorescent lamps, carbon arcs, etc., also radiate energy in the near-infrared region. For practical purposes, this region often is defined as falling between 0.7 and 5.0 microns, this being the region where common sources of infrared radiation emit substantially all of their infrared energy. Over half of the total radiation energy emitted by the sun or electrical lamps lies in the near-infrared region. This is shown in the following tables.

TABLE I.—APPROXIMATE DISTRIBUTION OF RADIANT ENERGY FROM SEVERAL ENERGY SOURCES

| | Percent of Total Radiant Energy Emitted | | | |
|---|---|---|---|---|
| | .3–.4µ | .4–.7µ | .6–1.6µ | Above .7µ |
| Sunlight (reaching earth) | 5 | 42 | 54 | 53 |
| Tungsten Lamp, 500 w | 0.1 | 10 | 53 | 90 |
| Fluorescent Lamp | 5 | 35 | 28 | 60 |
| Carbon Filament Heater | | 1 | 28 | 99 |
| Nonluminous Heater | 0 | 0 | 1.3 | 100 |

TABLE II.—APPROXIMATE DISTRIBUTION OF
RADIANT ENERGY OF SUNLIGHT

| Region | Percent of Total | Percent of Infrared |
|---|---|---|
| 0.3–0.4μ | 5 | |
| 0.4–0.7μ | 42 | |
| 0.7–1.0μ | 23 | 43.5 |
| 1.0–1.3μ | 12 | 22.5 |
| 1.3–1.6μ | 4.5 | 8.5 |
| 1.6–1.9μ | 4.5 | 8.5 |
| 1.9–2.7μ | 5 | 9.5 |
| 2.7–up μ | 4 | 7.5 |

These tables indicate that within the near-infrared region, the greater part of the infrared energy is radiated within the region from about 0.7 to about 2.0 microns. For example, in normal sunlight some two-thirds of the radiant energy is at wavelengths of from about 0.7 to about 1.3 microns. Accordingly, it may be seen that a large proportion of the energy transmitted by our common light sources serves no useful purpose with respect to illumination, but contributes to the development of heat in the material receiving the radiation.

It also may be noted in Table II that some 43–44% of the total infrared radiation in sunlight is in the region just above about 0.7 micron. The latter is about the upper limit of the visible range which, as noted above, usually is defined as from about 0.4 to about 0.7 micron, hence the "near" infrared designation. While by the foregoing definition the near-infrared region extends only down to about 0.7 micron, for purposes of this invention the region of particular interest extends from about 0.65 micron to about 1.3 microns. In the following discussion this region will be designated by the abbreviation (NIR).

In many circumstances it is desirable to filter out nonvisible radiations of the near-infrared region without materially diminishing transmission of visible radiations. There are many potential applications for materials that will transmit a major portion of the visible radiations but at the same time be at least semiopaque to heat-producing infrared radiation, particularly that in the above-noted (NIR). Among such possible applications may be mentioned sunglasses, welders' goggles and other eye protective filters, windows, television filters, projection lenses and the like. In many, if not most, of such uses the primary object is to protect the human eye from the adverse effects of radiation in the near infrared.

Experience has shown that sunglasses, as an illustrative example, should be capable of transmitting at least about 10% of incident visible light shorter than about 0.65 micron. However, to provide adequate protection for the human eye, transmission should be less than forty percent at from about 0.65 to about 0.75 micron and not over about ten percent between about 0.75 and about 0.95 micron. Preferably, some 20% or more of visible light will be transmitted. In the two other noted ranges, preferably transmission should not exceed about five percent and one percent, respectively.

Other protective optical filters may vary as to requirements in the visible range. In most cases, however, transmission in the near-infrared should not exceed the indicated limitations. This applies, for example, not only to other eye protective devices as widely different as welders' goggles and window glass, but also to protecting inanimate material as in the case of projection lenses. Optimum protective utility, therefore, ordinarily requires relatively good transmission of radiation below about 0.65 micron but reduced or minimized transmission above that value. Obviously, complete cutoff as exactly this, or any other wavelength, is impossible. Nevertheless, for the purposes of this invention, cutoff should be as sharp as possible within a minimum spread of wavelength at about 0.65 micron.

Aminium salts of this invention strongly absorb in the (NIR) portion of the spectrum, particularly in the vicinity of 0.96–0.965 micron. For this reason, salts of this invention in suitable substrates have a wide range of utility for purposes such as those noted above.

Various organic plastic substrates are available having generally suitable transmission properties in the visible region. Illustrative examples include:

cellulose derivatives such as
    cellulose nitrate, cellulose acetate and the like;
    regenerated cellulose and cellulose ethers as for example, ethyl and methyl cellulose;
polystyrene plastics such as
    polystyrene per se and polymers and copolymers of various ring-substituted styrenes such for example as o-, m- and p-methylstyrene and other ring-substituted styrenes as well as side-chain substituted styrenes such as alpha-, methyl- and ethylstyrene and various other polymerizable and copolymerizable vinylidenes;
various vinyl polymers and copolymers such as
    polyvinyl butyral and other acetals, polyvinyl chloride, polyvinyl acetate and its hydrolysis products, polyvinyl chloride-acetate copolymers and the like;
various acrylic resins such as
    polymers and copolymers of methyl acrylate, methyl methacrylate, acrylamide, methylolacrylamide, acrylonitrile and the like;
polyolefins such as
    polyethylene, polypropylene and the like;

polyesters and unsaturated-modified polyester resins such as those made by condensation of polycarboxylic acids with polyhydric phenols or modified using unsaturated carboxylic acid and further modified by reacting the alkyd with another monomer;

polymers of allyl diglycol carbonate; and various copolymers using as a cross-linking monomer an allyl ester of various acids. Of particular interest and preferred herein as substrates are cellulose acetate, methyl methacrylate, polystyrenes and polymers of allyl diglycol carbonates.

Any one such substrate may, and usually does, vary from the others very appreciably in its transmission of radiant energy at various wavelengths. Nevertheless, if not modified, none meet the foregoing transmission requirements. Some additive is necessary to decrease the infrared transmission without adversely affecting transmission in the visible range.

Heat resistance of the salts of this invention can be demonstrated when the aminium salts are dispersed in plastic materials, or when dissolved in solvents they are adequately resistant to exposure to temperatures up to about 200° C. This temperature is frequently encountered in the processing of plastic substrates such as those discussed above. Accordingly, they are much better suited for some purposes than those of the above-noted copending application.

The invention will be further illustrated in conjunction with the following examples. Therein, unless otherwise noted all parts and percentages are by weight and all temperatures are in degrees centigrade.

EXAMPLE 1

Tris(p-diethylaminophenyl)aminium hexafluoroarsenate $$[(C_2H_5)_2N-\langle\phantom{xx}\rangle-]_3\overset{+}{N} AsF_6^-$$

To 4.58 parts (1 mol part) of tris(p-diethylaminophenyl)amine in 120 parts of acetone is added 2.97 parts (1 mol part) of silver hexafluoroarsenate in 40 parts of acetone. After stirring for one hour, the reaction mixture is filtered and concentrated in vacuo to about 50% of its original volume. The resulting solution is diluted with about 140 parts of ethyl ether and cooled in a Dry Ice-acetone mixture. A green solid separates. It is collected, washed well with cold water, then with cold petroleum ether and finally is dried in vacuo. The product, in a yield of about 75% of theory, melts with decomposition at 119° C.

*Analysis.*—Calcd. for: $C_{30}H_{42}N_4AsF_6$: C, 55.6; H, 6.5; N, 8.7. Found: C, 53.1; H, 6.3; N, 8.7.

EXAMPLE 2

*Tris(p-diethylaminophenyl)aminium hexafluoroantimonate*

To 4.58 parts (1 mol part) of tris(p-diethylaminophenyl)amine in 120 parts of acetone is added 3.44 parts (1 mol part) of silver hexafluoroantimonate in 40 parts of dimethylformamide. After stirring for one hour, the reaction mixture is filtered and concentrated in vacuo to approximately 40% of the original volume. The resulting solution is diluted with about 140 parts of ether and then cooled in a Dry Ice-acetone mixture. The green solid which separates is collected, washed well with cold ether, then with petroleum ether and is finally dried in vacuo. The product, 58% of theory yield, melts at 85° C.

*Analysis.*—Calcd. for: $C_{30}H_{42}N_4SbF_6$: C, 51.9; H, 6.1; N, 8.1. Found: C, 51.8; H, 5.8; N, 8.1.

EXAMPLE 3

With reference to the following table, using the general procedure of Example 2, substituting for the one mol part of tris(p-diethylaminophenylamine) one mol part of the corresponding amine wherein the alkyl is that shown, and the silver salt is that of the acid shown, the products shown are obtained.

TABLE I

| Alkyl | Acid | Product |
|---|---|---|
| Methyl | $HSbF_6$ | Tris(p-dimethylaminophenyl)aminium hexafluoroantimonate. |
| n-Propyl | $HSbF_6$ | Tris(p-di-n-propylaminophenyl)aminium hexafluoroantimonate. |
| i-Butyl | $HSbF_6$ | Tris(p-di-iso-butylaminophenyl)aminium hexafluoroantimonate. |
| Methyl | $HAsF_6$ | Tris(p-dimethylaminophenyl)aminium hexafluoroarsenate. |
| i-Propyl | $HAsF_6$ | Tris(p-di-iso-propylaminophenyl)aminium hexafluoroarsenate. |
| n-Butyl | $HAsF_6$ | Tris(p-di-n-butylaminophenyl)aminium hexafluoroarsenate. |

EXAMPLE 4

Solutions of the products of Examples 1 and 2 in methanol and in methyl salicylate are prepared and spectral absorption curves thereof are determined in the near-infrared region of the spectrum. For this purpose, a recording spectrophotometer fitted with a near-infrared attachment and a tungsten light source is used. The wavelength of maximum absorbence ($\lambda_{max.}$) is determined from the curve. Absorptivity at the wavelength of the maximum absorption, designated ($a_{max.}$), is an expression of the degree of absorption. It is calculated using the following relationship:

$$a_{max.} = \frac{1}{bc} \log \frac{T_o}{T}$$

wherein the several symbols have the following meanings:

$a$ = absorptivity
$b$ = the thickness of the spectrophotometer cell in cm.
$c$ = the concentration in grams per liter
$T$ = transmittance of light passing through the solution
$T_o$ = transmittance of light passing through the solvent in the same cell.

The $\lambda_{max.}$ of both products of Examples 1 and 2 is found to be at about 960 millimicrons. The $a_{max.}$ is shown in the following Table II.

TABLE II

| Aminium Salt | $a_{max.}$ | |
|---|---|---|
| | Methanol | Methyl Salicylate |
| Example 1 | 71.2 | 65.8 |
| Example 2 | 72.1 | 66.2 |

EXAMPLE 5

To illustrate the improved heat stability of the compounds of this invention, solutions in methyl salicylate of the tris(p-diethylaminophenyl)aminium salts of Examples 1 and 2 and of other salts having the same aminium cation but differing anions are prepared and $a_{max.}$ determined. The solutions are heated in an oil bath having a temperature of 200°–205° C. Samples remain in the bath for eight minutes. After about three to four minutes, the temperature of the sample is about 190° C., and the sample is maintained at a temperature of 190°–195° C. for the remainder of the heating period. The amount of decomposition is determined from spectral curves taken on a spectrophotometer. The concentration of the solutions is 0.10 g./liter and a 0.1-cm. cell is used for the spectral analysis. Illustrative results are shown in the following table.

TABLE III

| Anion | $a_{max.}$ | Percent Absorber Remaining |
|---|---|---|
| Hexafluoroantimonate | 66.2 | 76 |
| Hexafluoroarsenate | 65.8 | 70 |
| Perchlorate | 88.6 | 49 |
| p-Toluenesulfonate | 30.1 | 37.6 |
| Fluoborate | 81.8 | 25 |
| Fluoride | 32.3 | 23.5 |
| Ethylsulfonate | 15.9 | 19.5 |
| Trifluoroacetate | 75.5 | 4.2 |
| Nitrate | 67.8 | 0 |

EXAMPLE 6

Heat stability tests are run by the general procedure of Example 5 using methyl salicylate solutions of tris(p-diethylaminophenyl)aminium perchlorate and tris(p-diethylaminophenyl)aminium hexafluoroantimonate. The samples reach a temperature of 190° in about three minutes, and then are held at about 190°–200° for the remainder of the heating periods indicated in the following table. The percent of the original absorber remaining after 5, 10 and 15-minute heating periods is shown in the following table.

TABLE IV

| Salt | Percent Original Absorber Remaining | | |
|---|---|---|---|
| | 5 Min. | 10 Min. | 15 Min. |
| Perchlorate | 41.5 | 22.9 | 12.2 |
| Hexafluoroantimonate | 76 | 65 | 57 |

EXAMPLE 7

The general procedure of Example 5 is repeated using methyl salicylate solutions of tris(p-diethylaminophenyl)aminium hexafluoroantimonate and tris(p-diethylaminophenyl)aminium hexafluoroarsenate. The samples reach a temperature of about 180° C. after four minutes and are held at a temperature of 180°–190° C. for the remainder of each of heating periods five minutes, ten minutes and fifteen minutes. Illustrative results of the absorber stability measurements are shown in the following table.

TABLE V

| Salt | Percent Original Absorber Remaining | | |
|---|---|---|---|
| | 5 Min. | 10 Min. | 15 Min. |
| Hexafluoroantimonate | 81 | 81 | 77.5 |
| Hexafluoroarsenate | 86.4 | 83 | 81 |

EXAMPLE 8

Heat stability tests are run by the general procedure of Example 5 using methyl salicylate solutions of tris(p-diethylaminophenyl)aminium fluoborate and tris(p-diethylaminophenyl)aminium hexafluoroarsenate. The solutions are heated at 150° C. for 100 minutes. Table VI shows the percent of the original absorber remaining after 30, 60 and 100 minutes.

TABLE VI

| Anion | Percent Original Absorber Remaining | | |
|---|---|---|---|
| | 30 Min. | 60 Min. | 100 Min. |
| Fluoborate | 65 | 47 | 36 |
| Hexafluoroarsenate | 98 | 98 | 95 |

EXAMPLE 9

Acetone solutions of poly(methyl methacrylate) resin and the products of Examples 1 and 2 are prepared. Acetone solutions of tris(p-diethylaminophenyl)aminium fluoborate and tris(p-diethylaminophenyl)aminium perchlorate also are prepared containing 0.1% of absorber based on the weight of the resin. Solutions of resin and absorber are then combined, and the solvent removed by casting films on plate glass and drying them in a 70° C. oven for one hour. Resultant films are removed from the plate glass and cut into small strips. These strips are compression molded for four minutes between plates electrically heated at about 200° C. using 12 tons of pressure. The amount of additive remaining after this heat treatment is measured spectrophotometrically. Illustrative results are shown in Table VII.

TABLE VII

| Anion | Percent Original Absorber Remaining |
|---|---|
| Hexafluoroantimonate | 72 |
| Hexafluoroarsenate | 61 |
| Fluoborate | 4 |
| Perchlorate | 3 |

These results obtained in Examples 4–9, particularly those of Example 9, illustrate the markedly increased heat resistivity of the hexafluoroantimonate and hexafluoroarsenate salts which make them especially useful for incorporation in plastics which must be subsequently exposed to temperatures up to about 200° C.

As illustrated in the foregoing example, a high proportion of the amount of absorber initially added remains in the substrate after heating. To obtain an equivalent residual content of the fluoborate or perchlorate some fifteen to twenty-five times as much must be initially added. These results are typical of other previously-proposed salts. To add such amounts is not practical. In some cases, such large amounts cannot be taken up by the substrate. In others the decomposition products produced during the essential heating develop such excessive coloration as to make the resultant products non-useful.

In use, aminium salts of the present invention may be incorporated in any suitable plastic or applied on suitable transparent substrates of plastic or glass. This is done by any of several known procedures, including for example; solution casting or dipping; hot milling; burnishing; or by dyeing. Organic plastic material containing the aminium salts can be molded into formed articles such as sheets and plates.

In any method of use, the salts may be incorporated as a barrier layer in or near one surface of a substrate or be disseminated therethrough. Choice of either practice depends on the type of protection used and the physical method used to combine the substrate and the salt or salts.

Either practice can be used to protect the treated material. Either can also be used to form a protective barrier between an object to be protected and the source of the infrared radiation. In the latter case, protection is usually provided by combining salt and organic substrate in a relatively thin layer or sheet which is then used as the protective barrier. Protection of an object also can be obtained by coating the salts, in a suitable vehicle, directly onto substrates such as glass or formed plastic objects whether to protect the substrate or in forming a protective barrier for other objects.

It is not readily possible to assign limits to the amount which it is desirable to use. In general, the limiting maximum is only an economic one. As to the minimum, it depends on whether the salt is disseminated uniformly through the substrate or is concentrated in a barrier layer of the same or a different substrate. When disseminated through a substrate, usually to protect the latter, there should be provided at least about 0.01 weight percent of the substrate. When concentrated in a barrier layer there should be at least 0.01 gram per square foot of surface.

We claim:

1. A method for increasing the infrared absorption of an organic plastic material capable of transmitting visible light which comprises incorporating in said material at least 0.01% by weight of a compound of the formula

wherein R is an alkyl of from 1–5 carbon atoms and X⁻ is an anion selected from the group consisting of hexafluoroantimonate and hexafluoroarsenate.

2. A method according to claim 1 in which the cation is tris(p-dimethylaminophenyl)aminium.

3. A method according to claim 1 in which the cation is tris(p-diethylaminophenyl)aminium.

4. A method according to claim 1 in which the cation is tris(p-dipropylaminophenyl)aminium.

5. A method according to claim 1 in which the cation is tris(p-dibutylaminophenyl)aminium.

6. A method according to claim 1 in which the cation is tris(p-diamylaminophenyl)aminium.

7. A method according to claim 1 in which said compound is disseminated substantially uniformly throughout said organic plastic material.

8. A method according to claim 1 in which said compound is concentrated at the exposed surface of said organic plastic material.

9. The method for protecting an object against the deleterious effect of incident near-infrared radiation which comprises interposing between said object and the source of said radiation, a barrier consisting essentially of an organic plastic material capable of transmitting visible light containing at least about 0.01 gram per square foot of exposed surface of said barrier of a compound of the formula

wherein R is an alkyl of from 1–5 carbon atoms and X⁻ is an anion selected from the group consisting of hexafluoroantimonate and hexafluoroarsenate.

10. A composition of matter consisting essentially of an organic plastic material capable of transmitting visible light having incorporated therein at least 0.01 percent by weight of a compound of the formula

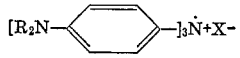

wherein R is an alkyl of from 1–5 carbon atoms and $X^-$ is an anion selected from the group consisting of hexafluoroantimonate and hexafluoroarsenate.

11. A composition of matter consisting essentially of an organic plastic material capable of transmitting visible light having incorporated on at least one surface thereof at least 0.01 gram per square foot of a compound of the formula

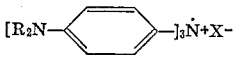

wherein R is an alkyl of from 1–5 carbon atoms and $X^-$ is an anion selected from the group consisting of hexafluoroantimonate and hexafluoroarsenate.

References Cited

UNITED STATES PATENTS

| | | | |
|---|---|---|---|
| 1,485,655 | 3/1924 | Wells | 252—300 |
| 1,604,761 | 10/1926 | Sherts | 252—300 X |
| 2,330,963 | 10/1943 | Feinberg | 260—440 |
| 2,631,158 | 3/1953 | Vaughan | 260—440 |
| 2,905,570 | 9/1959 | Hawthorne et al. | 252—300 X |
| 2,952,575 | 9/1960 | Baltzer | 252—300 X |
| 2,971,921 | 2/1961 | Coleman et al. | 252—300 |
| 3,000,833 | 9/1961 | Coleman et al. | 252—300 |

OTHER REFERENCES

Neunhoeffer et al.: Chem. Ber., 92, 245–251, (1959).

Sharp: J. Chem. Soc., 1957, pp. 4804–4809.

LEON D. ROSDOL, *Primary Examiner.*

JULIUS GREENWALD, ALBERT T. MEYERS, *Examiners.*

R. D. LOVERING, *Assistant Examiner.*